United States Patent Office 3,409,627
Patented Nov. 5, 1968

3,409,627
ALKENYL-3,4,5,6-TETRAHYDROPYRIDINE
COMPOUNDS
Richard Parke Welcher, Old Greenwich, and Linda Clarendon Mead, Greenwich, Conn., assignors to American Cyanamid Company, Stamford, Conn., a corporation of Maine
No Drawing. Filed Oct. 11, 1965, Ser. No. 494,936
6 Claims. (Cl. 260—296)

ABSTRACT OF THE DISCLOSURE

Alkenyl-3,4,5,6-tetrahydropyridine compounds of the formula

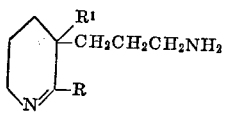

wherein $R^1$ is hydrogen, a hydrocarbon substituent, or aminopropyl, R is a hydrocarbon substituent; and at least one of $R^1$ and R is alkenyl or cycloalkenyl. The compounds are useful as fungicides and pesticides.

---

This invention relates to ethylenically unsaturated amines.

More particularly this invention relates to 3,4,5,6-tetrahydropyridines of the formula

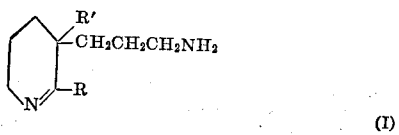

(I)

wherein R′ is hydrogen, a hydrocarbon substituent, or aminopropyl, R is a hydrocarbon substituent, and at least one of R′ and R is alkenyl or cycloalkenyl.

The hydrocarbon substituents may be aliphatic, including straight, branched, and cyclic structures; aromatic; and mixed aliphatic-aromatic, and may contain up to 30 carbon atoms or more. Aliphatic substituents include alkyl, e.g., methyl, ethyl, propyl, isopropyl, n-butyl, isobutyl, tertiary butyl, pentyl, heptyl, nonyl, decyl, dodecyl, tridecyl, heptadecyl, octadecyl, and the like. Other aliphatic substituents are cycloalkyl, e.g., cyclopropyl, cyclobutyl, cyclopentyl, cyclohexyl, cycloheptyl, cyclooctyl, cyclononyl, decahydronaphthyl; alkenyl, e.g., vinyl, propenyl, isopropenyl, butenyl, isobutenyl, allyl, crotyl; and cycloalkenyl, e.g., cyclopropenyl, cyclobutenyl, cyclopentenyl, cyclohexenyl, cycloheptenyl, cycloheptadecenyl; and the like. Typical aromatic and mixed aliphatic-aromatic hydrocarbon substituents are aryl, e.g., phenyl, naphthyl, and anthracyl; aralkyl, e.g., benzyl; alkaryl, e.g., tolyl (ortho, meta, para); alkaralkyl, e.g., xylyl (ortho, meta, para), and the like. Preferred hydrocarbon substituents are those containing up to and including 18 carbon atoms. The equivalents of the foregoing are also contemplated, including the various isomers, tautomers, and hydrocarbon-substituted homologs, thereof. Moreover, it will be seen from Formula I that one or both of R and R′ must be alkenyl or cycloalkenyl, including structures wherein one of R and R′ is alkenyl and the other is cycloalkenyl.

The terthydropyridines defined by Formula I above are prepared by hydrogenating known di- or tricyanoethylated ketones in the presence of known hydrogenation catalysts substantially as disclosed in copending application Ser. No. 476,684, filed Aug. 2, 1965. That case, incorporated herein by reference, discloses a process for preparing novel piperidine compounds by hydrogenation in which the hydrogenation may be interrupted before complete reaction and a tetrahydropyridine intermediate isolated. Thereafter, in a second step, the tetrahydropyridine compound may be hydrogenated further to form the piperidine. The instant tetrahydropyridines therefore are prepared by incomplete hydrogenation of a corresponding di- or tricyanoethylated ketone having as a substituent at least one of alkenyl and cycloalkenyl in accordance with the equation:

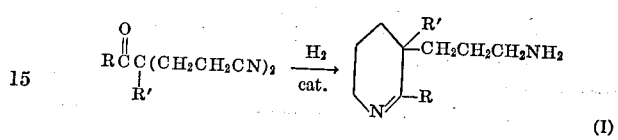

(I)

wherein R and R′ are as defined above.

The compounds of this invention possess dual functionality in that they contain both an amine group and ethylenic unsaturation. Hence these compounds undergo reactions which are typical of amines and ethylenically unsaturated compounds and are therefore useful in preparing a wide range of derivatives based on these reactions. For example, alkylene oxides and isocyanates react with the amine group to form amino-alcohol compounds and urea compositions, respectively. By virtue of the ethylenic unsaturation the amino-alcohol or ureas can then be copolymerized with such well-known monomers as ethylene, propylene, styrene, vinyl chloride, vinylidene chloride, vinyl acetate, acrylic acid, methacrylic acid, methyl acrylate, methyl methacrylate, vinyl ethyl ether, vinyl hexyl ketone, maleic acid esters and dienes such as butadiene-1,3, isoprene, allyl compounds such as diallyl phthalate, mixtures of two or more of the foregoing, and the like. It will also be apparent that the instant tetrahydropyridines are useful as co-reactants with the foregoing monomers to provide copolymers containing free amino groups for subsequent reaction with alcohols or isocyanates. The completed polymers, co-polymers, or cross-linked materials incorporating the instant tetrahydropyridine compounds are thermoplastic resins useful for the manufacture of molded products and films having known and virtually unlimited utility in industrial and consumer products.

The instant tetrahydropyridines are also useful as fungicides and pesticides particularly for the protection of plants. Various known techniques may be employed in the treatment of substrates and plants with the compounds of the invention including application in conjunction with solid, liquid, or gaseous materials. For example, concentrated solutions of the compound in a suitable inert organic solvent, e.g., xylene or high aromatic content hydrocarbons, preferably with a minor amount of a wetting or emulsifying agent, e.g., diglycol oleate, may be prepared. This solution may then be diluted to form an effective spray composition and applied to infested areas of plants.

The following examples serve to illustrate but not to limit the instant invention except as set forth in the claims. All parts and percentages are by weight unless otherwise specified.

EXAMPLE 1

To a rocking autoclave is charged 30.6 grams (0.15 moles) of 4-acetyl-4-isopropenylheptanedinitrile, 2.0 grams Raney cobalt, 3.0 grams ammonia and 50 milliliters of ethanol. The mixture is reacted for four hours at 120° C. and 700–1400 p.s.i.g. hydrogen pressure and filtered. The reaction product is then purified by vacuum distillation to give 22.2 grams (75% yield) of 3-(3-aminopropyl) - 3-isopropenyl - 2-methyl - 3,4,5,6-tetrahydropyridine:

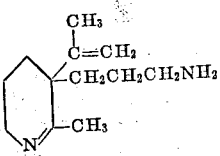

Identification of this produce was made by infrared spectrum and elementary analyses: Calc'd for $C_{12}H_{22}N_2$: C, 74.17%; H, 11.41%; N, 14.42%. Found: C, 74.60, 74.49%; H, 11.32, 11.01%; N, 14.60%.

EXAMPLES 2–9

In essentially the same manner as described in Example 1, the following tetrahydropyridines are prepared by catalytic hydrogenation of the corresponding ketones:

| Ketone | Product |
|---|---|
| 2. $C_6H_5\overset{O}{\underset{\|}{C}}C(CH_2CH_2CN)_2$ <br> $\underset{CH_3}{\overset{C=CH_2}{\|}}$ <br> 4-benzoyl-4-isopropenylheptanedinitrile | (tetrahydropyridine with $CH_3, C=CH_2, CH_2CH_2CH_2NH_2, C_6H_5$) <br> 3-(3-aminopropyl)-3-isopropenyl-2-phenyl-3,4,5,6-tetrahydropyridine |
| 3. $CH_2=CH\overset{O}{\underset{\|}{C}}C(CH_2CH_2CN)_2$ <br> $C_6H_5$ <br> 4-acrylyl-4-phenylheptanedinitrile | (tetrahydropyridine with $C_6H_5, CH_2CH_2CH_2NH_2, CH=CH_2$) <br> 3-(3-aminopropyl)-3-phenyl-2-vinyl-3,4,5,6-tetrahydropyridine |
| 4. $C_6H_5CH_2\overset{O}{\underset{\|}{C}}C(CH_2CH_2CN)_2$ <br> $CH=CH_2$ <br> 4-phenylacetyl-4-vinylheptanedinitrile | (tetrahydropyridine with $CH=CH_2, CH_2CH_2CH_2NH_2, CH_2C_6H_5$) <br> 3-(3-aminopropyl)-2-phenylmethyl-3-vinyl-3,4,5,6-tetrahydropyridine |
| 5. $C_6H_{11}\overset{O}{\underset{\|}{C}}C(CH_2CH_2CN)_2$ <br> $\underset{CH_3}{\overset{C=CH_2}{\|}}$ <br> 4-cyclohexylformyl-4-isopropenyl-heptanedinitrile | (tetrahydropyridine with $CH_3, C=CH_2, CH_2CH_2CH_2NH_2, C_6H_{11}$) <br> 3-(3-aminopropyl)-2-cyclohexyl-3-isopropenyl-3,4,5,6-tetrahydropyridine |
| 6. $CH_3CH=CH\overset{O}{\underset{\|}{C}}C(CH_2CH_2CN)_2$ <br> $CH_3$ <br> 4-crotonyl-4-methylheptanedinitrile | (tetrahydropyridine with $CH=CHCH_3, CH_2CH_2CH_2NH_2, CH_3$) <br> 3-(3-aminopropyl)-2-methyl-3-propenyl-3,4,5,6-tetrahydropyridine |
| 7. $C_6H_5CH=CH\overset{O}{\underset{\|}{C}}C(CH_2CH_2CN)_2$ <br> $CH_2C_6H_5$ <br> 4-benzyl-4-cinnamoylheptanedinitrile | (tetrahydropyridine with $CH_2C_6H_5, CH_2CH_2CH_2NH_2, CH=CHC_6H_5$) <br> 3-(3-aminopropyl)-3-benzyl-2-styryl-3,4,5,6-tetrahydropyridine |
| 8. $C_6H_5CH=CH\overset{O}{\underset{\|}{C}}C(CH_2CH_2CN)_2$ <br> $C_5H_9$ <br> 4-cinnamoyl-4-cyclopentylheptanedinitrile | (tetrahydropyridine with $C_5H_9, CH_2CH_2CH_2NH_2, CH=CHC_6H_5$) <br> 3-(3-aminopropyl)-3-cyclopentyl-2-styryl-3,4,5,6-tetrahydropyridine |
| 9. 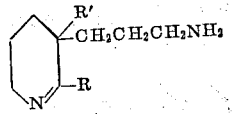 <br> 4-isopropenyl-4-methacrylylheptanedinitrile | (tetrahydropyridine with two $C=CH_2/CH_3$ groups and $CH_2CH_2CH_2NH_2$) <br> 3-(3-aminopropyl)-2,3-diisopropenyl-3,4,5,6-tetrahydropyridine |

What is claimed is:
1. A compound of the formula

(structure: tetrahydropyridine with R' and $CH_2CH_2CH_2NH_2$ at 3-position, R at 2-position)

wherein R' is selected from the group consisting of hydrogen, lower alkyl, cyclohexyl, isopropenyl, vinyl, styryl, phenyl and benzyl. R is selected from the group consisting of lower alkyl, cyclohexyl, isopropenyl, vinyl, styryl, phenyl and benzyl.

2. 3 - (3 - aminopropyl) - 3 - isopropenyl - 2 - methyl-3,4,5,6 - tetrahydropyridine.
3. 3 - (3 - aminopropyl) - 3 - isopropenyl - 2 - phenyl-3,4,5,6 - tetrahydropyridine.
4. 3 - (3 - aminopropyl) - 3 - phenyl - 2 - vinyl - 3, 4,5,6 - tetrahydropyridine.
5. 3 - (3 - aminopropyl) - 2 - cyclohexyl - 3 - isopropenyl - 3,4,5,6 - tetrahydropyridine.
6. 3 - (3 - aminopropyl) - 2 - methyl - 3 - propenyl-3,4,5,6 - tetrahydropyridine.

References Cited

Takata et al., J. Chem. Soc. Japan (Nippon Kagaku Zasshi), vol. 85, No. 3, March 1964, 2 Page Index to Contents and Pages 237–238 QD 1 C 65–J.

HENRY R. JILES, Primary Examiner.

A. L. ROTMAN, Assistant Examiner.

UNITED STATES PATENT OFFICE
CERTIFICATE OF CORRECTION

Patent No. 3,409,627                                November 5, 1968

Richard Parke Welcher et al.

It is certified that error appears in the above identified patent and that said Letters Patent are hereby corrected as shown below:

Column 4, line 41, after "benzyl" the period should be a comma; line 43, "benzyl." should read -- benzyl; and at least one of R' and R is alkenyl. --.

Signed and sealed this 17th day of March 1970.

(SEAL)
Attest:

Edward M. Fletcher, Jr.                     WILLIAM E. SCHUYLER, JR.
Attesting Officer                            Commissioner of Patents